(12) United States Patent
Ruschival et al.

(10) Patent No.: US 10,725,461 B2
(45) Date of Patent: Jul. 28, 2020

(54) PRODUCTION MODULE FOR A PRODUCTION PLANT

(71) Applicant: FESTO AG & Co. KG, Esslingen (DE)

(72) Inventors: Thomas Ruschival, Esslingen (DE); Andreas Häckh, Esslingen (DE)

(73) Assignee: Festo AG & Co. KG, Esslingen (DE)

( * ) Notice: Subject to any disclaimer, the term of this patent is extended or adjusted under 35 U.S.C. 154(b) by 0 days.

(21) Appl. No.: 16/037,823

(22) Filed: Jul. 17, 2018

(65) Prior Publication Data
US 2019/0041832 A1 Feb. 7, 2019

(30) Foreign Application Priority Data
Aug. 7, 2017 (DE) .......................... 10 2017 117 876

(51) Int. Cl.
*G05B 19/418* (2006.01)
*G05B 19/042* (2006.01)

(52) U.S. Cl.
CPC ... *G05B 19/41865* (2013.01); *G05B 19/0426* (2013.01); *G05B 19/41855* (2013.01); *G05B 2219/15074* (2013.01); *G05B 2219/2612* (2013.01); *G05B 2219/32087* (2013.01)

(58) Field of Classification Search
None
See application file for complete search history.

(56) References Cited

U.S. PATENT DOCUMENTS

| | | | |
|---|---|---|---|
| 6,430,454 B1 * | 8/2002 | Vasko | G06Q 10/06 700/100 |
| 6,942,785 B2 | 9/2005 | Bayer et al. | |
| 2007/0136594 A1 * | 6/2007 | Jordan | G05B 19/054 713/172 |
| 2010/0131076 A1 | 5/2010 | Colombo et al. | |
| 2015/0301522 A1 | 10/2015 | Ochs et al. | |

FOREIGN PATENT DOCUMENTS

| | | |
|---|---|---|
| DE | 101 06 558 C1 | 2/2001 |
| DE | 10 2012 110 723 A1 | 5/2014 |
| DE | 10 2015 212 264 A1 | 1/2017 |
| WO | 2008/068333 A1 | 6/2008 |

OTHER PUBLICATIONS

Gerdes et al. "Declarative Resource Discovery in Distributed Automation Systems," SNE Simulation Notes Europe SNE 20(3-4), pp. 13-20, 2010.

* cited by examiner

*Primary Examiner* — Sean Shechtman
(74) *Attorney, Agent, or Firm* — Falk Ewers; Ewers IP Law PLLC

(57) ABSTRACT

A production module for a production plant has a first data interface, an electronic response device, and a second data interface. The first data interface receives a list of tasks for producing an article or substance from a production module positioned downstream in the production direction. The electronic response device responds to tasks from the list of tasks which can be carried out by the production module. The second data interface sends the list of tasks to a production module positioned upstream in the production direction.

15 Claims, 4 Drawing Sheets

PRODUCTION MODULE FOR A PRODUCTION PLANT

CROSS REFERENCE TO RELATED APPLICATIONS

This application claims priority to German patent application DE 10 2017 117 876.7 filed on Aug. 7, 2017, which is hereby incorporated by reference in its entirety.

TECHNICAL FIELD

The present disclosure relates to a production module for a production plant, to a production plant, and to a method for operating a production plant.

BACKGROUND

In process automation, systems are known which are subdivided into individual task modules. The adjacent task modules in a process chain are controlled directly by a superordinate system. In addition, there exist approaches which create a virtual image of a production plant from static construction data. For example, not only the individual devices but also the connections, pipelines, and wirings between these devices are stored in this virtual image. This makes the virtual image navigable. At any given device, via the connections directly attached thereto and the properties thereof, it is possible to reach other devices indirectly.

Production plants in process industry are implemented in a complex, monolithic manner. As early as the planning phase, each component is selected and dimensioned in accordance with the established requirements. Subsequently, the individual components are for example fixedly interconnected via pipelines. The production plant thus implements a process control for a precisely defined production capacity. The production plant scales poorly, and so it is often impossible to produce smaller amounts than or different substances from the originally planned substance in the same production plant economically. In process control, material flows are generally fixedly defined by the pipework of the plant and are unidirectional in terms of the process. Thus, a filter has a functional direction determined by its construction, or a boiler has a maximum heating power which cannot be exceeded. This has to be taken into account in the planning and configurations, as in conventional monolithic planning. However, this information is static, and the correspondence with the actual construction has to be intricately monitored.

In the current related art, no process-flow-dependent, task-orientated communication takes place. This has the drawback that a superordinate system has to direct the entirety of the coordination of and possess the entire knowledge about the plant.

U.S. Pat. No. 6,942,785 B2 relates to a system for automated treatment of fluids, comprising process modules which can be strung together and are replaceable. A superordinate control system connected to a data bus can automatically procure all essential information concerning the construction of the system, including the fluid bus connections between the individual process modules, and can, based on this information, for example, visualize the construction of the system, automatically detect construction errors, and control the process flow in the system.

US 2015/0301522 A1 relates to a production plant for producing a chemical and/or pharmaceutical product. A superordinate control and/or regulation device is set up to automatically query information from process sub-modules connected to the communications network.

SUMMARY

It is an object of the present disclosure to configure a production plant to be modular and scalable in such a way that it can be adapted in a simple manner to the manufacture of different products.

This object is achieved by a production module for a production plant and a method for operating a production plant as disclosed herein.

In a first aspect of the disclosure, this object is achieved by a production module for a production plant comprising a first data interface for receiving a list of tasks for the production of an article or substance from a production module positioned downstream in the production direction; an electronic response device for responding to tasks from the list of tasks which can be carried out by the production module; and a second data interface for sending the list of tasks to a production module positioned upstream in the production direction. This achieves the technical advantage that the production module can extract those tasks which it is capable of performing. A superordinate control system can be dispensed with.

A production module comprising one or more inflow ports, such as a mixer, can store the capabilities of the production modules positioned upstream and autonomously devise which of these it would like to perform the requested task. In a further exemplary embodiment of the production module, the production module is formed so as technically to carry out the task responded to. This achieves, for example, the technical advantage that each task from the list of tasks can be processed by the production module.

In a further exemplary embodiment of the production module, the response device is formed to send a confirmation message via the first data interface to a production module positioned downstream. As a result, the technical advantage is achieved, for example, that the confirmation messages can be evaluated at another production module.

In a further exemplary embodiment of the production module, the response device is formed to receive a confirmation message from a production module positioned upstream via the second data interface. This achieves, for example, the technical advantage that the confirmation messages can be evaluated at the production module.

In a further exemplary embodiment of the production module, the response device is formed to pass on the received confirmation message via the first data interface to a production module positioned downstream. This achieves the technical advantage, for example, that the confirmation messages can be collected.

In a further exemplary embodiment of the production module, the production module is a production module for processing a liquid or flowable substance. This achieves, for example, the technical advantage that a liquid or flowable product can be manufactured in a simple manner.

In a further exemplary embodiment of the production module, the electronic response device is formed to remove a performable task from the list of tasks. This achieves the technical advantage, for example, that the duration and the amount of data for transmitting the list of tasks upstream are reduced.

In a further exemplary embodiment of the production module, the response device is formed to confirm the receipt of the list of tasks to the production module positioned downstream. This achieves, for example, the technical advantage that it can be checked that the list of tasks has been passed on and has been transferred without error.

In a further exemplary embodiment of the production module, the response device is formed to send a first part of the list of tasks to a first production module and a second part of the list of tasks to a second production module. This achieves the technical advantage, for example, that the data volume and the time for transferring the list of tasks can be reduced.

In a further exemplary embodiment of the production module, the production module is a container filling device, an analysis device, a mixer, a pump, a tank, a valve device, a handling device, an automation module, and/or a process module. This achieves, for example, the technical advantage that production modules particularly suitable for manufacturing liquids can be used.

In a further exemplary embodiment of the production module, the production module is formed to store the capabilities of the production modules positioned upstream and to decide by which production module the requested task will be performed. This achieves, for example, the technical advantage that suitable production modules can be selected.

According to another aspect, an object of the disclosure is achieved by a modular production plant for producing an article or substance comprising at least one production module as discussed above. The same technical advantages can be achieved by way of the production plant as by way of this production module.

In an exemplary embodiment of the modular production plant, the production plant is a process production plant for manufacturing a flowable or liquid substance. This achieves, for example, the technical advantage that flowable or liquid products can be manufactured in a simple manner.

In a third aspect, the object is achieved by a method for operating a production plant, comprising the steps of receiving a list of tasks for the production of an article or substance from a production module positioned downstream in the production direction; responding to tasks from the list of tasks which can be carried out by the production module, using an electronic response device; and sending the list of tasks to a production module positioned upstream in the production direction via a second data interface. The same technical advantages can be achieved by way of the method as by way of the production module in accordance with the first aspect.

In an exemplary embodiment of the method, the production module technically performs the task responded to. This achieves for example the technical advantage that each task from the list of tasks can be processed by the production module.

In an exemplary embodiment of the method, the confirmation message is sent via the first data interface to a production module positioned downstream. This also achieves for example the technical advantage that the confirmation messages can be evaluated at another production module.

In a further exemplary embodiment of the method, the confirmation message is received by a production module positioned upstream via the second data interface. This achieves for example the technical advantage that the confirmation messages can be evaluated at the production module.

In a further exemplary embodiment of the method, a performable task is deleted from the list of tasks. This also has for example the technical advantage that the time and the amount of data for transferring the list of tasks are reduced.

BRIEF DESCRIPTION OF THE DRAWINGS

The disclosure will now be described with reference to the drawings wherein:

FIG. 3 is a further schematic view of the production plant and of a list of tasks being passed on; and FIG. 4 is a further schematic view of the production plant and of a confirmation message being passed on.

DESCRIPTION OF EXEMPLARY EMBODIMENTS

Figure 1:
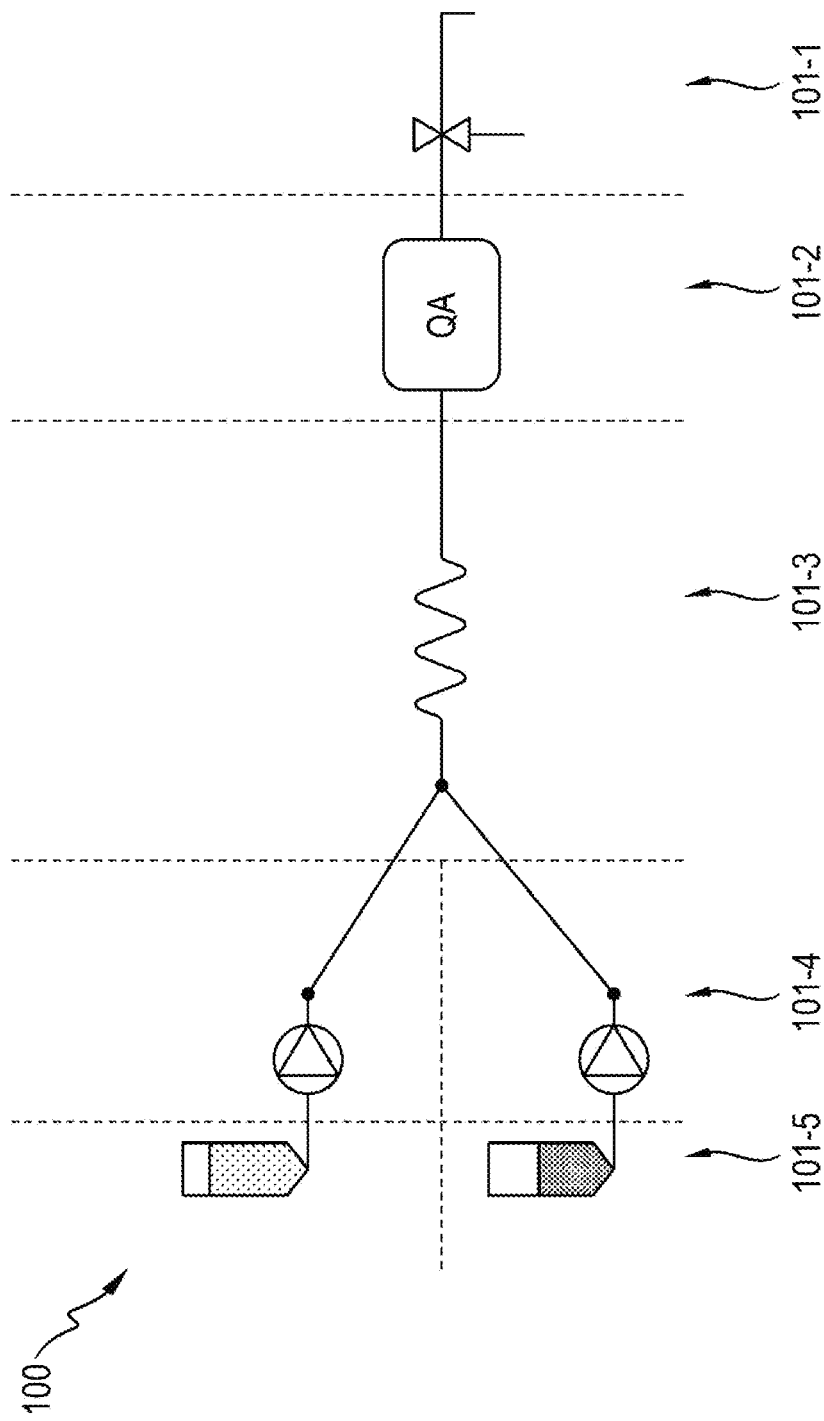
FIG. 1 shows an exemplary embodiment of a production plant.

FIG. 1 shows an exemplary embodiment of a production plant 100. The production plant 100 is for manufacturing a fluid, and comprises a plurality of production modules 101-1, . . . , 101-5, which each perform a different task during manufacture. The production modules 101-1, . . . , 101-5 are autonomous modules which can automatically perform particular tasks in the production process and can be connected to other production modules.

The production module 101-1 is a container filling device, the production module 101-2 is an analysis device, the production module 101-3 is a mixer, the production modules 101-4 are pumps, and the production modules 101-5 are tanks. In general, however, the production modules 101-1, . . . , 101-5 may also be formed by other devices which are used in a production process. The boundaries between the individual production modules are indicated by dashed lines.

As a result of the series connection of the production modules 101-1, . . . , 101-5, a particular substance is manufactured by a process in the production plant 100. The production modules 101-1, . . . , 101-5 are fluidically interconnected, for example via hoses or lines. If for example a particular substance is to be manufactured, for example the liquid starting materials are supplied to the mixer 101-3 from the tanks 101-5 in a particular amount via the pumps 101-4. The starting materials are subsequently stirred in the mixer 101-3 and supplied to the analysis device 101-2 before they are filled into containers as a finished product by the container filling device 101-1.

The tanks 101-5 perform the task of storing the starting materials in a particular amount. The pumps 101-4 perform the task of pumping the starting materials at a particular flow rate. The mixer 101-3 performs the task of mixing the starting materials and producing a predetermined mixing ratio. The analysis device 101-2 performs the task of analysing the mixing ratio of the mixed substance, and the container filling device 101-1 performs the task of filling the mixed substance into containers at a predetermined flow rate and in a predetermined amount.

This results in a material flow from the tanks 101-5 towards the container filling device 101-1. The production plant 100 is of a modular construction such that the individual production modules 101-1, . . . , 101-5 can also be interconnected in a different manner in a different construction of the production plant. In general, however, the production plant may also be a production plant for manufacturing different physical, non-liquid products.

Figure 2:
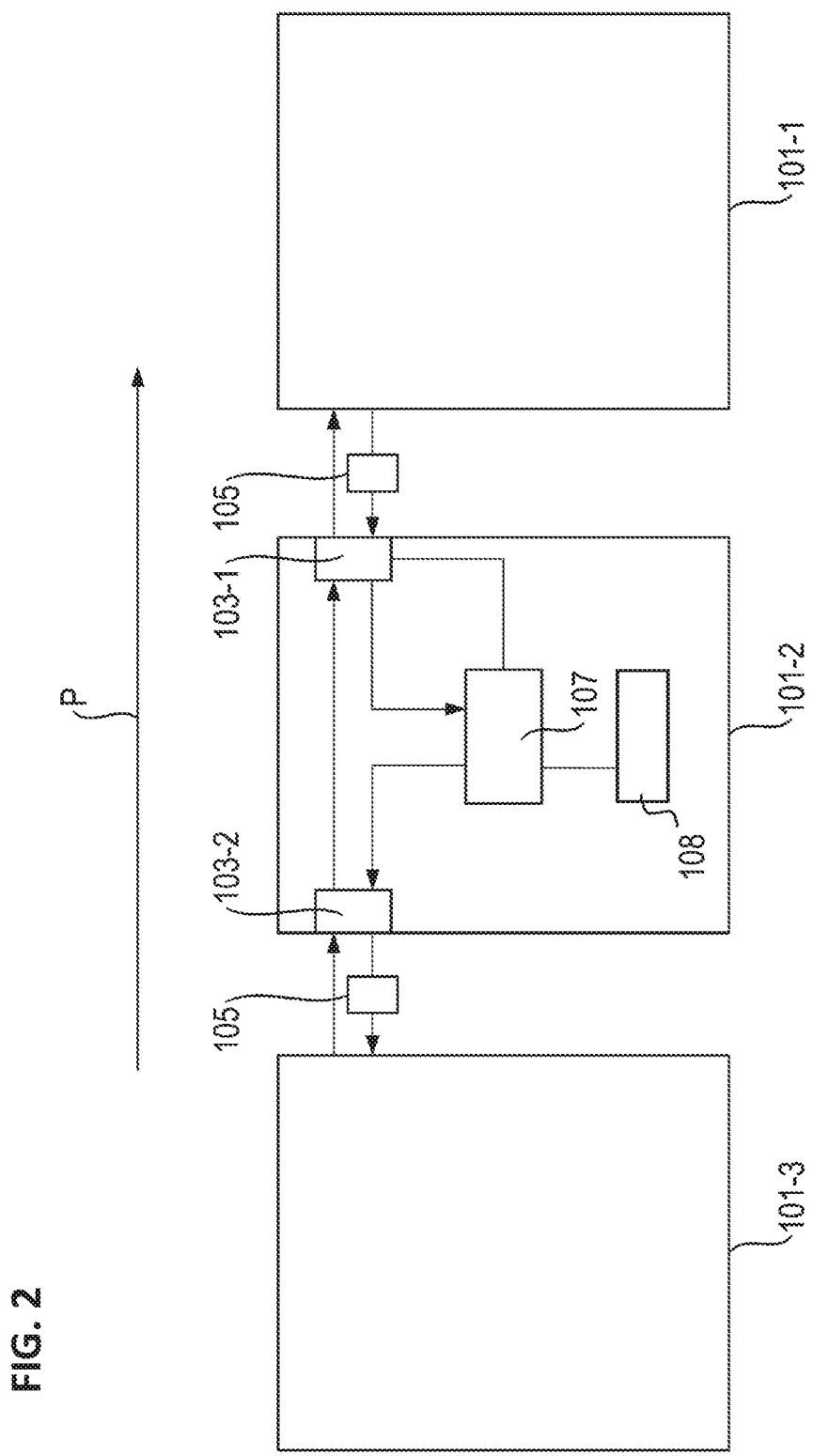
FIG. 2 is a schematic view of a production module in the production plant.

FIG. 2 is a schematic view of a production module 101-2 in the production plant 100. If a particular substance is to be outputted by the container filling device 101-1, a list of tasks 105 is initially created comprising tasks by way of which the desired substance can be manufactured. In the list of tasks 105, the method process is broken down into individual steps, such as mixing or temperature control, which can be technically implemented in the specialized production modules 101-1, ..., 101-5 by production components 108, such as a stirring unit or boiler.

This list of tasks 105 comprises for example the tasks: supply 8 ml starting material 1, supply 5 ml starting material 2, pump starting material 1 at a flow of 1000 µl/min, pump starting material 2 at a flow rate of 1200 µl/min, mix for 2 hours, analyse the mixing ratio of the product, and output the product in an amount of 1000 µl. In this way, the recipe for the product is successfully broken down into particular elementary tasks which can be carried out by the individual production modules 101-1, ..., 101-5. This list of tasks 105 can be formed by an electronic file comprising all of the elementary tasks. The file may for example be in XML format. In general, however, the list of tasks may also be implemented in a different manner.

The production modules 101-1, ..., 101-5 are communicatively interconnected, in such a way that information can be exchanged between adjacent production modules 101-1, ..., 101-5. The connection between the production modules 101-1, ..., 101-5 is manufactured via corresponding data interfaces 103-1 and 103-2. The data interfaces 103-1 and 103-2 may be wired or wireless. For example, the production modules 101-1, ..., 101-5 comprise WLAN interfaces or LAN interfaces as data interfaces 103-1 and 103-2. The LAN interfaces are connected using a LAN cable. In general, any suitable protocol and any suitable data interface may be used to exchange the information in question between the adjacent production modules 101-1, ..., 101-5.

The production module 101-2 comprises the first data interface 103-1 for receiving the list of tasks 105 for producing an article or substance from a production module 101-1 positioned downstream in the production direction P; an electronic response device 107 for responding to tasks from the list of tasks 105 which are performable by the production module 101-2; and the second data interface 103-2 for sending the list of tasks 105 to a production module 101-3 positioned upstream in the production direction P.

The electronic response device 107 is formed for example by a data processing device comprising a memory and a processor or a hard-wired circuit. In the non-volatile memory, it is stored and defined, in a suitable syntax, which tasks can be performed by the production module 101-2 and what state the production module 101-2 is in. The processor is for processing the stored data.

The electronic response device 107 is capable of comparing the received list of tasks against the tasks which can be performed by the production module 101-2. If the production module 101-2 finds a task which it can perform in the list of tasks 105, the response device 107 generates an electronic confirmation message for this task. This means that each production module 101-1, ..., 101-n knows its own technical properties and states and these are communicated downstream.

Since the production module 101-2 knows its own physical and process properties, it can communicate its current state. For this purpose, the production module 101-2 comprises corresponding sensors and measurement devices. Within its specification and parameters, the production module 101-2 offers services for performing the tasks. The production modules 101-1, ..., 101-5 communicate tasks which they cannot themselves perform or conditions required for these tasks to adjacent production modules 101-1, ..., 101-5. The other production modules 101-1, 101-3, 101-4 and 101-5 are of the same construction, and so they can be connected and configured in any desired manner within the production system.

If the substance is to be produced by means of the production plant 100, the list of tasks 105 is initially inputted to the production module 101-1 positioned furthest downstream in the production direction P. Communication takes place via the last node of the process control system. The tasks on the list of tasks 105 are thus provided to the last production module 101-1 in the chain and migrate upwards counter to the material flow P.

The first production module 101-1 analyses the list of tasks 105, finding the tasks from the list of tasks 105 which can be performed by the production module 101-1. For this purpose, each production module 101-1, ..., 101-5 has a digital representation of its state. For example, a tank knows its own contents and filling amount. Further, each production module 101-1, ..., 101-5 knows process variables which it can influence. For example, the pump controls the flow of medium and the mixer combines substances. In addition, each production module 101-1, ..., 101-5 knows its own direct neighbours.

At a mixer having three inflow ports for starting materials, for example two of the three inflow ports may supply the associated starting material in the required amount. In this case, the mixer can decide whether 100% of the required amount is supplied from just one production module 101-1 positioned upstream or whether portions of the overall amount are supplied by two inflow ports.

If a task from the list of tasks 105 can be performed by the production module 101-1, the response device 107 generates a corresponding confirmation message. Subsequently, the list of tasks 105 is passed on to the production module 101-2 positioned adjacently upstream in the production direction P. This process is carried out by every other production module 101-2, ..., 101-5 until the list of tasks 105 has arrived at the last production module 101-5. Each of the production modules 101-2, ..., 101-5 sends a corresponding confirmation message to the adjacent production module 101-2, ..., 101-5. These confirmation messages subsequently arrive back at the production module 101-1 positioned furthest downstream in the production direction P. The production modules 101-2, ..., 101-5, which are connected in series, thus respond to service requests of upstream production modules 101-2, ..., 101-5. Information concerning the state and capabilities of the individual production modules 101-1, ..., 101-5 is aggregated and migrates downstream alongside the material flow.

If all of the tasks from the list of tasks are responded to positively, the process method can be carried out and the product can be manufactured. The production plant 100 constructed from individual production modules 101-1, ..., 101-n thus meets the technical requirements for manufacturing the product. Moreover, it can be ensured that the requirements on the individual production modules 101-1, ..., 101-n are not exceeded during the manufacture of the product. The operator at the end of the process chain therefore does not have to know the entire production plan 100 and the process connections thereof from a superordinate position so as to assess whether a product can be manufactured.

The production modules 101-1 to 101-5 have standardized interfaces, in such a way that they can be combined in any desired manner so as to retool the production plant 100 rapidly for new products.

The services and tasks offered by the production plant 100 and the quality of service are negotiated in relation to the transit time between the production modules 101-1, . . . , 101-5.

As a result of the lists of tasks being sent and passed on between the individual production modules 101-1, . . . , 101-5, no hierarchical arrangement or knowledge of the overall system from the outside is required. The performance of the constructed production plant 100 can be verified in relation to the transit time on the basis of the aggregated information of the individual production modules 101-1, . . . , 101-5.

The production modules 101-1, . . . , 101-5 detect relevant information from the production modules 101-1, . . . , 101-5 positioned upstream, since they can query what is located therein. As a result, the production modules 101-1, . . . , 101-5 can determine what products can be supplied. Information obtained is passed on downstream. As a result, the superordinate system obtains a description of the performance of the production plant 100 without knowing the details of the configuration.

Figure 3:
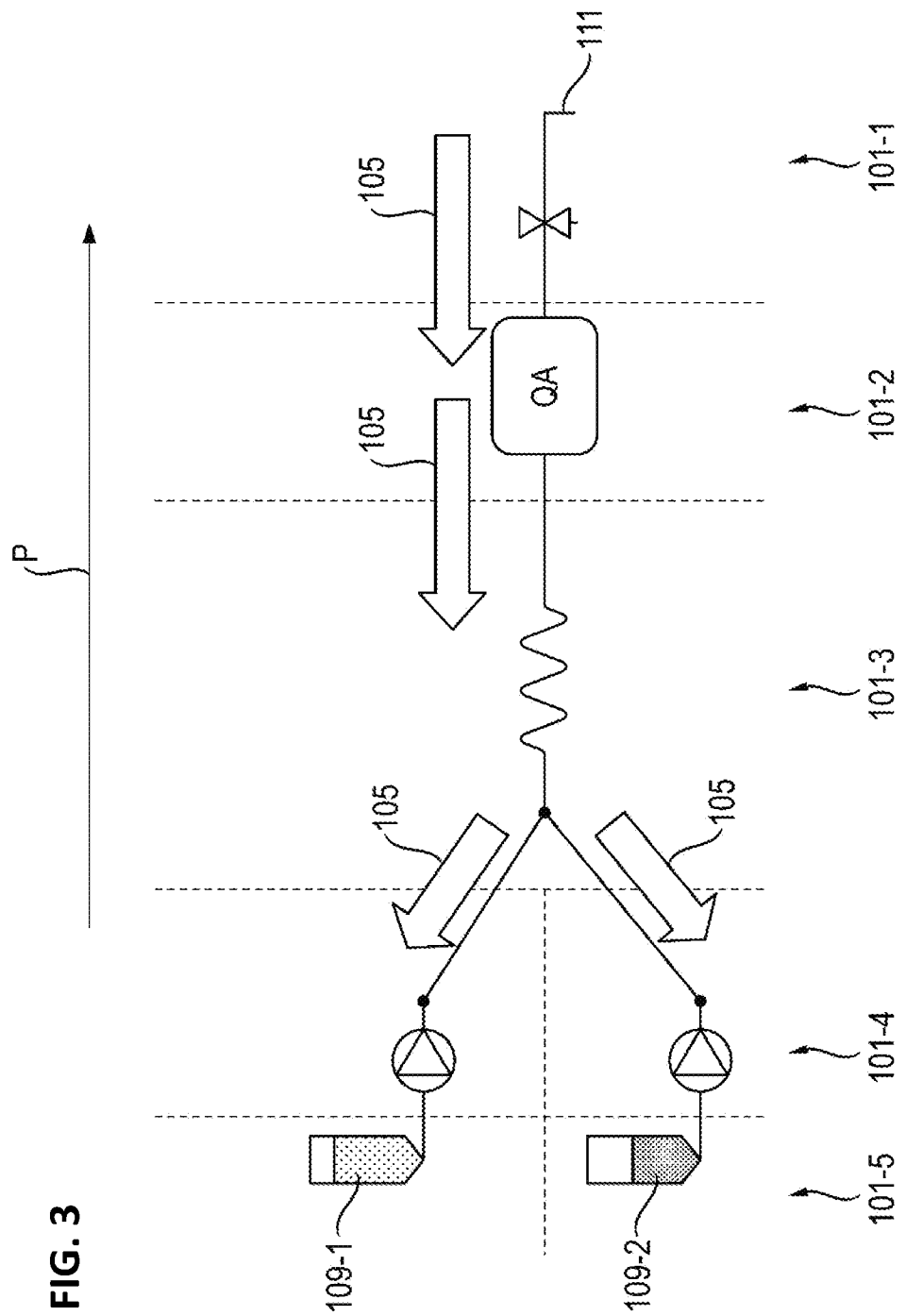

FIG. 3 is a further schematic view of the production plant 100. The list of tasks 105 is inputted into the production module 101-1 (container filling device).

The list of tasks 105 comprises for example the tasks of manufacturing a product 111 from the starting materials 109-1 and 109-2 at a mixing ratio of 30 to 70 and a filling rate of 1000 µl/min. The production module 101-1 interprets the tasks and variables which it can influence from the list of tasks 105. The production module 101-1 detects that the user wishes to fill a particular ratio into containers at a particular flow and a filling rate of 1000 µl/min can be provided. Subsequently, the list of tasks 105 is passed on to the production module 101-2.

The production module 101-2 (analysis device) deduces from the list of tasks 105 for example that the mixing ratio is to be analyzed. The analysis device interprets the mixing ratio, and the initial command is passed on. The production module 101-2 detects that it can perform this task and sends a corresponding confirmation message to the production module 101-1 positioned downstream. The list of tasks 105 is subsequently in turn passed on to the production module 101-3. The analysis device 101-2 indirectly influences the process variable of ratio, and sends ratio requirements upstream. This brings about indirect regulation.

The production module 101-3 (mixer) deduces from the list of tasks 105, for example, that the mixing ratio is to be 30 to 70. The production module 101-3 detects that it can perform this task and sends a corresponding confirmation message to the production module 101-2 positioned downstream. From there, the confirmation message is passed on to the production module 101-1 positioned downstream. The mixer can interpret ratio and flow, and new commands to production modules 101-4 and 101-5 positioned upstream are generated.

The list of tasks 105 is subsequently passed on to the production modules 101-4 (pumps).

The production modules 101-4 deduce from the list of tasks 105 that the starting material 109-1 is to be conveyed at a flow of 1000 µl/min and the starting material 109-2 is to be conveyed at a flow of 1200 µl/min. The pumps 101-4 interpret the variable of "flow" and react thereto. Since these production modules 101-4 can perform these tasks, they likewise send a confirmation message to the production module 101-3 positioned downstream, which is subsequently passed on as far as the production module 101-1.

The list of tasks 105 is subsequently passed on to the production modules 101-5 (tanks).

The production modules 101-5 deduce from the list of tasks 105 that the starting material 109-1 is to be provided in an amount of 8 ml and the starting material 109-2 is to be manufactured in an amount of 5 ml. Since these production modules 101-5 know that amount held in reserve and can perform these tasks, they likewise send a confirmation message to the production module 101-4 positioned downstream, which is subsequently passed on as far as the production module 101-1.

The commands and tasks are sent counter to the flow direction of the medium. The commands and tasks are acknowledged, or an error is reported. Production modules 101-1, . . . , 101-5 positioned downstream react to the status. Once all confirmation messages for each task from the list of tasks have arrived at the production module 101-1, it can be established that all tasks are performable by the production plant 100 and that the product 111 can be manufactured using the production plant 100.

In this disclosure, production modules 101-1, . . . , 101-5 respond to queries to indirect neighbors. The user at the end of the process chain therefore does not have to ascertain/know the entire system. The information concerning process variables and module state migrates along the medium flow as far as the end of the production plant 100. The production modules 101-1, . . . , 101-5 obtain requirements or tasks from production modules 101-1, . . . , 101-5 positioned adjacently downstream. The production modules 101-1, . . . , 101-5 detect which commands/requirements they can implement themselves and if appropriate pass on the command upstream to the adjacent production module 101-1, . . . , 101-5.

Figure 4:
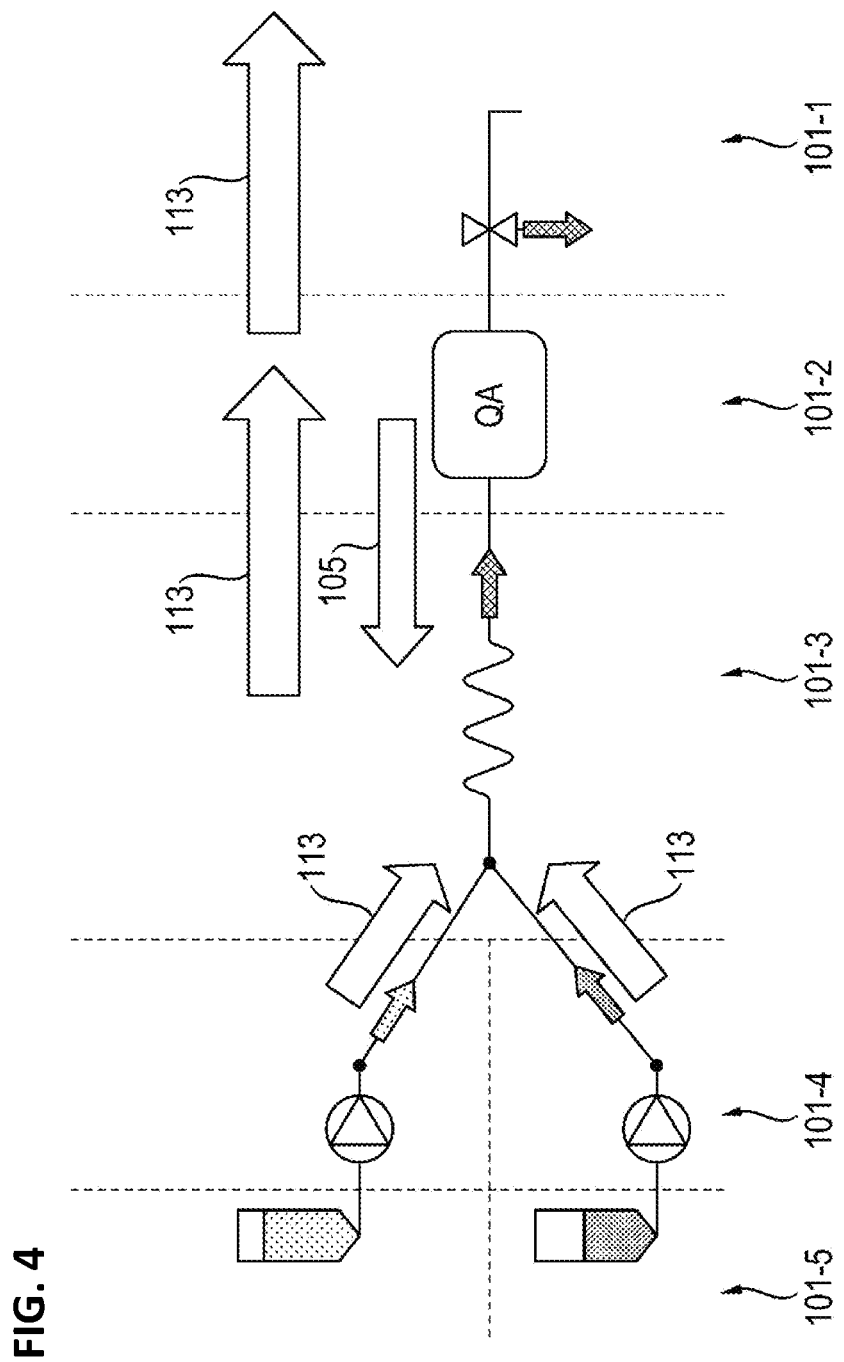

FIG. 4 is a further schematic view of the production plant 100 and of the confirmation message 113 being passed on. The confirmation message 113 from each production module 101-1, . . . , 101-5 is sent downstream. The pump 101-4 gives acknowledgement to the mixer 101-3.

The mixer 101-3 sees that its requirements are met and gives confirmation to the analysis device 101-2. The analysis device 101-2 analyses autonomously and reports errors onwards to neighbors. If the mixing ratio does not correspond to the predetermined mixing ratio, the container filling device 101-1 disposes of the medium and the analysis device 101-2 sends new commands to adjust the ratio.

All features explained and shown in connection with individual embodiments of the disclosure can be provided in a different combination in the subject matter of the disclosure so as to bring about the advantageous effects thereof simultaneously.

The scope of protection of the present disclosure is given by the claims and is not limited by the features described or shown in the drawings.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE NUMERALS

100 Production plant
100-1 Production module/container filling device
100-2 Production module/analysis device
100-3 Production module/mixer
100-4 Production module/pump
100-5 Production module/tank
103-1 Data interface
103-2 Data interface
105 List of tasks
107 Electronic response device
109-1 Starting material 1
109-2 Starting material 2
111 Product
113 Confirmation message
P Material flow

The invention claimed is:

1. A modular production plant, comprising:
a production output module arranged at a position furthest downstream in a production direction and including an interface to initially input a list of tasks to be carried out to manufacture a product, the task list being transmitted as an electronic file in an XML format;
at least one production module including:
a first data interface configured to receive the list of tasks only from a downstream production module positioned downstream adjacent to the production module in the production direction;
an electronic response device configured to respond to at least one task from the list of tasks which can be carried out by the production module by updating the list of tasks; and
a production component configured to carry out the at least one task based on the updated list of tasks by at least one of:
supplying at least one starting material,
pumping the at least one starting material,
mixing the at least one pumping material, and
opening a valve to output the product; and
a second data interface configured to send the list of tasks updated by the electronic response device to an upstream production module positioned upstream adjacent to the production module in the production direction.

2. The modular production plant according to claim 1, wherein the electronic response device is configured to send a confirmation message via the first data interface to the downstream production module.

3. The modular production plant according to claim 1, wherein the electronic response device is configured to receive a confirmation message from the upstream production module via the second data interface.

4. The modular production plant according to claim 3, wherein the electronic response device is configured to pass on the received confirmation message via the first data interface to the downstream production module.

5. The modular production plant according to claim 1, wherein the at least one production module is configured to process a flowable substance.

6. The modular production plant according to claim 1, wherein the electronic response device is configured to remove a performable task from the list of tasks.

7. The modular production plant according to claim 1, wherein the electronic response device is configured to confirm the receipt of the list of tasks to the at least one production module positioned downstream.

8. The modular production plant according to claim 1, wherein the electronic response device is configured to send a first part of the list of tasks to a first upstream production module and a second part of the list of tasks to a second upstream production module.

9. The modular production plant according to claim 1, wherein the at least one production module is at least one of a container filling device, an analysis device, a mixer, a pump, a tank, a valve device, a handling device, an automation module, or a process module.

10. The modular production plant according to claim 1, wherein the at least one production module is configured to store capabilities of a plurality of upstream production modules and to decide by which upstream production module from the plurality of upstream production modules the requested task will be performed.

11. The modular production plant according to claim 1, wherein the production plant is a process production plant for manufacturing a flowable substance.

12. A method for operating a production plant, the method comprising:
initially inputting into an interface at a production output module arranged at a position furthest downstream in a production direction a list of tasks to be carried out to manufacture a product, the task list being transmitted as an electronic file in an XML format;
receiving, by a first data interface of a production module, only from a downstream production module positioned downstream adjacent to the production module in a production direction, the list of tasks;
responding, by an electronic response device, to at least one task from the list of tasks which can be carried out by the production module by updating the list of tasks,
carrying out, by a production component, the at least one task based on the updated list of tasks by at least one of:
supplying at least one starting material,
pumping the at least one starting material,
mixing the at least one pumping material, and
opening a valve to output the product; and
sending the list of tasks updated by the electronic response device to an upstream production module positioned upstream adjacent to the production module in the production direction via a second data interface.

13. The method according to claim 12, further comprising:
sending a confirmation message to the downstream production module via a first data interface.

14. The method according to claim 12, further comprising:
the upstream production module receiving a confirmation message via the second data interface.

15. The method according to claim 12, further comprising:
deleting a performable task from the list of tasks.

* * * * *